(12) United States Patent
Doval et al.

(10) Patent No.: US 6,476,834 B1
(45) Date of Patent: Nov. 5, 2002

(54) DYNAMIC CREATION OF SELECTABLE ITEMS ON SURFACES

(75) Inventors: Diego Doval, White Plains, NY (US); Thomas Yu-Kiu Kwok, Washington Township, NJ (US); Kenneth Blair Ocheltree, Ossining, NY (US); Clifford Alan Pickover, Yorktown Heights, NY (US); Gregory Fraser Russell, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,387

(22) Filed: May 28, 1999

(51) Int. Cl.$^7$ ................................................. G06F 9/00
(52) U.S. Cl. ...................................... 345/863; 345/826
(58) Field of Search ........................... 345/863, 825–826, 345/744–747, 864, 762–763, 816, 838, 839, 840, 728–729, 702, 707–708, 711, 183; 382/189

(56) References Cited

U.S. PATENT DOCUMENTS

| | | | | |
|---|---|---|---|---|
| 5,583,946 A | * | 12/1996 | Gourdol | 345/863 |
| 5,801,704 A | * | 9/1998 | Oohara et al. | 345/863 |
| 6,020,881 A | * | 2/2000 | Naughton et al. | 345/863 |
| 6,057,845 A | * | 5/2000 | Dupouy | 345/826 |
| 6,088,481 A | * | 7/2000 | Okamoto et al. | 382/189 |
| 6,097,392 A | * | 8/2000 | Leyerle | 345/863 |
| 6,313,853 B1 | * | 11/2001 | Lamontasue et al. | 345/762 |
| 6,377,288 B1 | * | 4/2002 | Moran et al. | 345/863 |

\* cited by examiner

*Primary Examiner*—Steven Sax
(74) *Attorney, Agent, or Firm*—Douglas W. Cameron; Anne Vachon Dougherty

(57) ABSTRACT

Using a writing surface, such as paper on a portable digital notebooks (PDNs) or the surface of a digital white board, users draw, on the fly, selectable items such as buttons with text inside. The user could even draw symbols, on the fly, in the air with his/her finger. The user then selects the drawn selectable item to initiate a function.

37 Claims, 3 Drawing Sheets

DYNAMIC CREATION OF SELECTABLE ITEMS ON SURFACES

DESCRIPTION

1. Technical Field

This invention relates to selectable items on a writing surface. More specifically, the invention relates to selectable items or symbols, drawn by users on paper, to specify or initiate certain functions.

2. Background of the Invention

Graphical user interfaces (GUIs) provide ways for users of computers and other devices to effectively communicate with the computer. In GUIs, available applications and data sets are often represented by icons consisting of small graphical representations that can be selected by a user and moved on the screen. The selection of icons often takes the place of typing in a command using a keyboard in order to initiate a program. In general, icons are tiny on-screen symbols that simplify access to a program, command, or data file. Icons are usually activated or selected by moving a mouse-controlled cursor onto the icon and pressing a mouse button.

GUIs include graphical images on computer monitors and often consist of both icons and windows. (GUIs may also reside on the screens of televisions, kiosks, and automatic teller machines (ATMs)) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with icons usually simplifies a user's interactions with a computer, GUIs are often tedious and frustrating to use. Icons must be maintained in a logical manner. It is difficult to organize windows and icons when many are similarly displayed at the same time on a single device.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. A typical user's screen contains many icons, and only a subset of them will at any one time be valid, useful targets for a selected icon. For example, it would not be useful to drag the icon representing a data file on top of an icon whose only purpose is to access an unrelated multimedia application.

With the growing use of pen-based input devices—for example, Portable Digital Notepads (PDNs) that may be interfaced to devices such as computers—a need arises for a method and system for drawing and recognizing selectable buttons, dials, sliders, menus, and gauges on paper that may be selected by the user after the items are drawn. The items' functions are determined by a system that recognizes handwritten text, symbols, frames, and other shapes.

As one example of a PDN, the CrossPad (A.T. Cross Company) uses a specially designed digital pen and pad designed by Cross, and core technology developed by IBM, so that CrossPad users take notes in ink on a standard pad of paper (8.5"×11" for CrossPad and 6"×9" for CrossPad XP.) The CrossWriter Digital Pen contains a radio frequency (rf) transmitter. As the user writes, the pen transmits a signal through the paper and the handwriting is captured by the digital notepad.

To access and view "digital handwriting," the user plugs the CrossPad into a PC or other device via a cable that attaches to any standard COM port and presses a button. The handwriting is transferred to the PC and appears on the screen. Currently, to create a new electronic page, a user presses another button on the CrossPad and then flips or removes the paper page.

The problem with prior-art pen-based systems is that they do not supply a convenient and very versatile means for dynamically creating or drawing on the fly selectable items or symbols, such as buttons, on a writing surface that may be selected to initiate a function. Although these devices provide hardware buttons and icons (if there is an attached display), these devices limit the number of available functions that are quickly available to a user.

OBJECTS OF THE INVENTION

An objective of this invention is an improved system and method for specifying selectable items on writing surfaces such as paper on a portable digital notebook.

SUMMARY OF THE INVENTION

This invention makes portable digital notebooks (PDNs) and other pen-based devices such as "digital white boards" more versatile, by providing a method and apparatus for dynamically generating selectable items such as buttons, dials, sliders, menus, and gauges. With this invention a user can draw, on the fly, an image or symbol on a position sensing surface and when that image or symbol is selected, a function assigned to the image is performed by the computer system. In this way, the user can quickly draw and select such symbols without the need for the PDN to have actual selectable symbols (such as hardware buttons to push) which would clutter the user interface and would not easily provide a multitude of functions.

Although the description here focuses on portable digital notebooks, other kinds of devices that rely on paper, such as electronic flipcharts (copyboard BF-060 by Kintronics), could also benefit from this invention. Other pen-input devices include white-boards and other wall surfaces that monitor handwritten input. For example, electronic white boards such as the Panasonic Panaboard KX-B730 may have a digitizing writing surface and a PC interface that permits transfer of digital information from the white board to a PC. The user can then fax, e-mail or import the information into other programs. Information can be networked or even sent via modem during a conference meeting. White boards may be mounted on walls or tables or on stands for mobile presentations.

This invention may be used on related devices as kiosks, video game displays, web browsers, white boards, personal digital assistants, smart watches, home shopping interfaces on TV, displays of financial data, etc., where there's a limited keyboard.

BRIEF DESCRIPTION OF THE DRAWINGS

FIG. 4 is a block diagram of a data structure that defines the functions associated with characteristics of the selectable items.

DESCRIPTION OF THE PREFERRED EMBODIMENT

Figure 1:
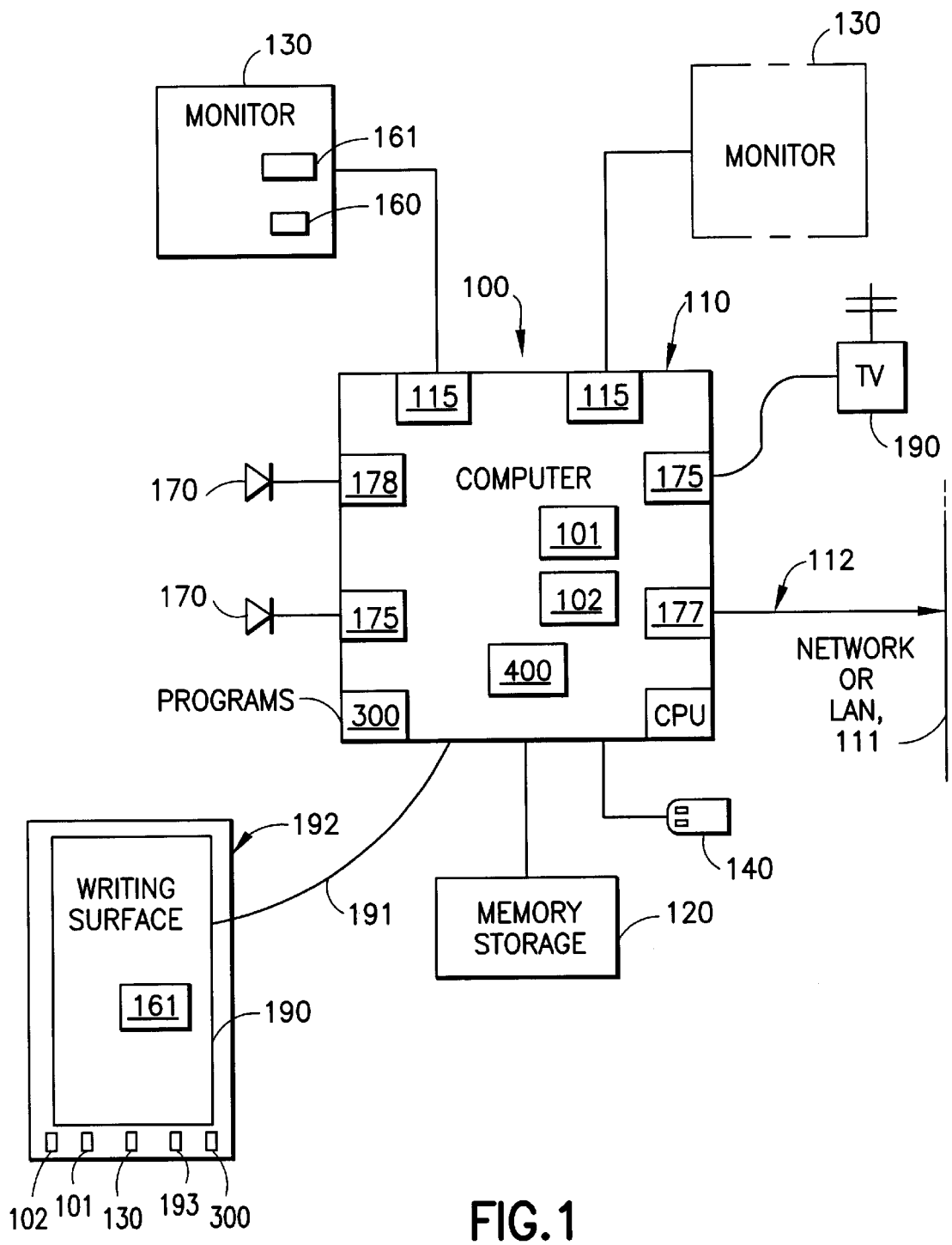
FIG. 1 is a block diagram of the hardware and one preferred embodiment of the present invention.

One preferred embodiment is represented in a block diagram in FIG. 1. This invention permits users to draw selectable items 161 on a writing surface 190 such as a paper pad 190 on top of a Crosspad (a PDN) or other writing-input device 192 that generally contains a digitizing unit for converting handwriting to a digital format. The writing surface may also be a touch-sensitive display 130 attached to a general-purpose device like a computer 110. The writing-input device 192 may be attached 191 through a wired or wireless connection to a general purpose computer 100 or other device which can receive information. The writing-input device 192 may also have a display 130 and onboard computer 193 to accomplish such tasks as digitization, noise reduction, handwriting recognition, etc. The user may also draw selectable items 161 on the computer's screen using objects such as a finger or stylus. A pen with ink that is usually used to write on a paper pad 190 could also be used with this invention. A user may also draw a symbol with hand gestures. The hand or body gestures need not be done on a writing surface, but may be performed in the air. Detecting the motion of finger or hand gestures in the air is taught in U.S. Pat. No. 5,454,043, entitled, "Dynamic and Static Hand Gesture Recognition through Low-level Image Analysis," issued on Jul. 30, 1993 to Mitsubishi Electric Research Laboratories, Inc. This patent is hereby incorporated herein by reference.

The present invention is capable of running on any general purpose writing-input device or computer system or computer controlled GUI (e.g. a television or virtual reality system), including GUIs that have the ability to present multimedia and/or virtual reality information.

The computer system 100 comprises a central processing unit (CPU) 110, memory storage device 120, one or more displays or graphical interfaces 130, and selection device 140 such as a mouse 140, speech recognition system 178, stylus 181, of finger 180. In one embodiment, an IBM Aptiva 100 comprises a central processing unit (CPU) 110, memory storage device 120, one or more monitors or LCD screens 130, and a mouse 140. These monitors or screens may be pressure-sensitive or in some other way receive pen-based input as is generally known to those skilled in the art. The mouse 140 may be used as a selection device although in pen-based systems a finger, pen, or stylus are generally used. On an IBM Aptiva, multiple monitors 130 can be controlled by multiple monitor adaptor cards 115. The computer system 100 may also have audio input/output capability 170. Some display adapters 175 can be used for audio/video playback 170. The adaptor 175 may also be used to display TV broadcasts/signals 190, e.g. "picture-in-picture" of TV broadcasts, and other full motion video and sound audio/visual on the monitors 130.

In addition, speech synthesis or speech recognition 178 may be provided. Speech recognition may take place using a IBM VoiceType Dictation Adapter.

In an alternative embodiment, the CPU 110 can be connected 112 via a network adaptor 177 to connect the system 100 to the network 111. Network adaptors 177 are well known. Three examples 177 include token ring adaptors, ethernet adaptors, and modems. The system 100 can be connected to other target monitors 130 through a client/server network (or LAN 111).

Systems that can be used to display graphical images, like icons and windows, are well known. GUIs can be used to control any apparatus having a monitor. In the field of television (TV), channel selection can be performed by selecting an icon consisting of the animated video broadcast on a given channel frequency.

Figure 2:
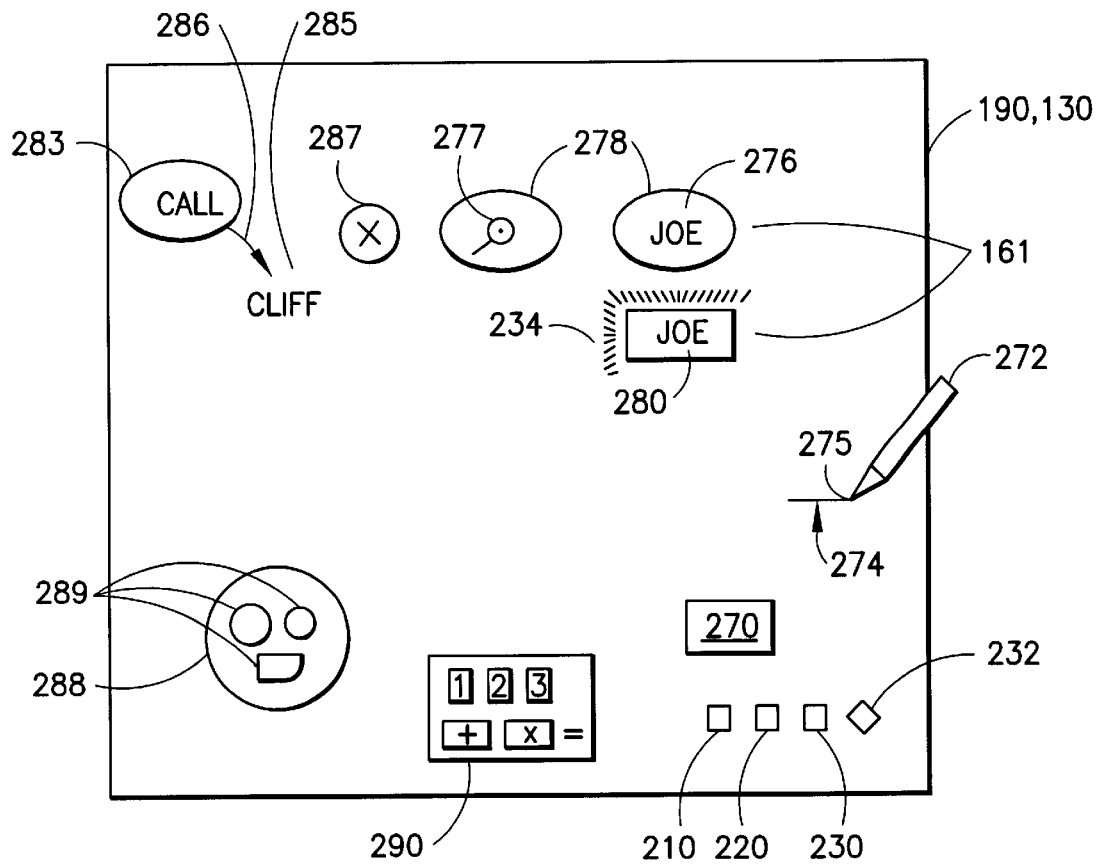
FIG. 2 is a drawing of a writing surface with graphical figures/selectable items on its graphical interface.

FIG. 2 is a block diagram of a writing surface 190 or 130 with hand-drawn selectable items 161 (See FIG. 1) representing functions, processes, applications, or programs 270 (300 in FIG. 1). In the present invention, the user uses a selection device (e.g. pen, stylus, hand, or finger) 272 to draw 274 a selectable item 161 which may include text 276 or other drawings such as a drawing of a magnifying glass 277 and an enclosing shape 278 such as a circle, rectangle, or triangle. If the user selects 280 the selectable item 161 by, for example, pressing the pen 272 somewhere near the selectable item, the user initiates the function, process, application, or program 300. For example, if the user draws "Joe," encloses the text with a circle, and then selects it, the system 192 or 100 may then initiate a phone call to Joe. If the user draws "Joe," encloses the text with a rectangle, and then selects it, the system 192 or 100 may pop-up an e-mail screen so that the user may compose an e-mail to Joe.

For additional examples, this description focuses on a handrawn selectable button 161, sometimes referred to as a "virtual button," although other selectable items are possible. To use the virtual button, the user can draw a circle or other shape in which he writes a text string such as "Address". The system recognizes the word "Address," and any other associated symbol or bounding shape, using handwriting recognition software 300 and other methods known to those skilled in the art. The user then selects the virtual button by touching it with a pen, such as the CrossWriter Digital Pen. In response to this selection, the PDN 192 or attached system 100 performs some function, such as displaying an address book, initiating a phone call, synchronizing data with another computer, etc. If the user's selection were performed on a touch-sensitve screen 130, the user could draw the virtual button with a stylus or finger and then select it with a stylus or finger. Similar to the description above, hand or body gestures may also be used not only for the drawing of symbols, but also for the selection of symbols. Also, as stated above, the detection of the motion and position of a hand or finger in the air it taught in U.S. Pat. No. 5,454,043.

The virtual button and other selectable items provide several advantages to the users of PDNs. For example, the user may draw the virtual button in any location on the PDN, and draw it more than once, thereby providing a flexible, quick, and easy-to-access function. In a similar manner, the user may draw virtual sliders selectable buttons, dials, sliders, menus, and gauges.

In addition to the general, aforementioned functions, the function of a virtual button may reflect both its associated handwritten text, shape of enclosure, or symbol and its position 287 on the PDN. For example, if the virtual button were used in different regions of the pad of paper, it may initiate different functions. A button in the upper right corner may refer to the entire page of information whereas one along the vertical margin may refer to a portion of the page. This functionality determined by position on the paper may also be useful when the function is to be applied to a particular drawing, sentence, name, or other graphical item. For example, drawing a "Call" button 283 next to a text string 285 "Cliff" may initiate a phone call to "Cliff Pickover." Drawing a "Date" button next to "Jan. 4, 2000" may associate this text string with a date attribute. Additionally, the association of a selectable item 161, 283 and a text string 285 may be created by drawing a connecting symbol, such as an arrow 286.

The shape of an enclosing region 278 may interact with the enclosed text 276 to give the virtual button greater versatility For example, "Call" enclosed by a circle may initiate an immediate phone call, whereas "Call" enclosed by a triangle may defer the call to some later time or initiate a reminder to make a phone call.

Users may combine the functions of various selectable items by drawing them next to one another and then selecting the set 289. A set may be distinguished by an enclosing boundary 288 in which a user makes a selection.

Users may build macros (sets of functions) 300 that may be triggered by pressing a virtual button.

The user may use the virtual buttons 161 to trigger the display of a menu or other set of selectable items on the connected display.

This invention may have particular value when a user only has access to a limited range of inputs, as for example when a user has no access to a keyboard, or limited display areas.

This invention may be used to create virtual calculators 290 in which selectable numbers and mathematical operators are drawn and selected in order to solve a mathematical problem. The answer may appear on display 130.

Users may create hand-drawn toolbars 210, page identifiers 220, etc. Users may associate ink drawings 230 with a particular piece of information.

Selectable items may represent links 232 on the world wide web or functions in a word processor.

Selectable items may cause delayed operations to be performed on data once the writing device is attached to a computer and the information downloaded to the computer.

In virtual reality systems, the selectable items 161 can be three dimensional objects. When the selectable item 161 is drawn on a display 130, it may change graphical characteristics 234 (e.g. brighten or change color) when the user selects 280 it so as to give users visual feedback that the selectable item 161 was indeed selected or to provide other information.

Figure 3:
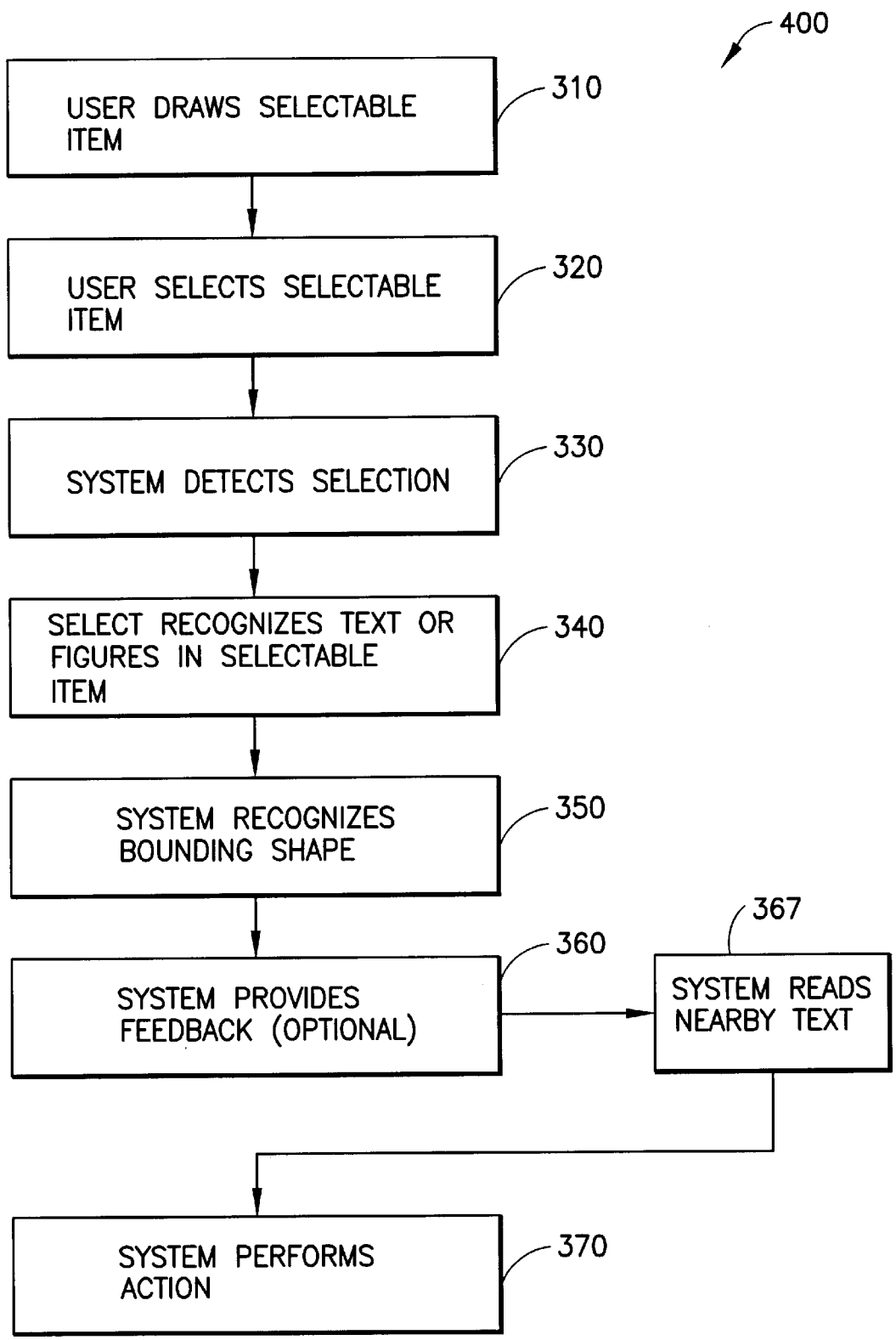
FIG. 3 is a flow chart showing the steps of one preferred method of the present invention.

FIG. 3 is a flow chart showing the steps 400 performed for a preferred version of drawing selectable items 161 and subsequent selection 280 on surfaces 190 or 130 and executed by system 192 or 100. In step 310, the user draws 274 a selectable item 161 which may consist of text 276 or FIGS. 277 optionally enclosed by a bounding shape 278 such as a circle. The drawing may be done with pen, stylus, hand, or finger, as explained.

In step 320, the user selects 280 the selectable item 161 for example by touching the selectable item 161 with the drawing tool, e.g. pen 272, for a certain amount of time. The selection 280 may also be accomplished by various means such as by performing a gesture, e.g. zigzagging motion with the pen or finger 272, speaking a word that is recognized by the speech recognition software 178, touching with a finger 180, etc.

In step 330, the system 192 or 100 detects the selection of selectable item 161 and also the location 287 (e.g. x, y coordinates) of the center of the selectable item. This may be accomplished by various means. For example, if a gesture in step 320 is performed near the selectable item, the system recognizes the selection. "Nearness" or "closeness" to the selectable item may be determined by computing the distances from the pen tip 275, finger 180, or stylus 182 to the center of the selected item 161. In one preferred embodiment, distances are computed using known geometrical methods. For example, if (x1,y1) are the coordinates of a selectable item 161 and (x2,y2) are the coordinates of the pen tip 275, then the distance is d=sqrt ((x2−x1)2+ (y2−y1)2). If d is less than a threshold, the selection of item 161 takes place.

In step 340, the system recognizes the text using handwriting recognition software 300 running on device 190 or 100. It also recognizes any FIG. 277 using figure recognition software 300 running on device 190 or 100.

In step 350, the system recognizes the bounding shape 278 using shape recognition software 300 running on device 190 or 100. It should be noted that steps 340, 350, and 330 may be executed in different orders to achieve the same result of selecting a selectable item 161 drawn by the user. Additionally, the shape recognition software 300 may detect the presence of bounding shapes within bounding shapes, as in 288. This nesting of shapes is useful when the system performs an action that corresponds to the combined action of different functions that are associated by an enclosing shape.

In step 360, the system (e.g. 100) may provide visual feedback 234 by changing the graphical characteristics 234 (such as brightening) of the selectable item 161. This would be possible when, for example, a stylus 181 is used on a touch-sensitive LCD screen 130. The selectable item 161 may change color, shape, brightness, texture, size, transparency, etc. once it has been selected. This would make it obvious to the user that a selection has taken place or provide additional information to the user, such as a warning that the intended action did not take place.

In step 367, the system 192, 100 reads nearby pieces of text 285 or other drawing 277 drawn on the writing surface 130 or 190 which may be needed for the system to perform the action. "Nearby" may be measured based on comparing the coordinates of the virtual button and pieces of text 285 or drawing 277 or by recognizing a connecting drawing, such as an arrow 286.

In step 370, the system associates the selection 280 with a particular action such as shutting down the system 192 or other example actions discussed. This association may be performed, for example in FIG. 4, by software 300 which compares the recognized bounding shape (and text and internal figures) with identifiers for shapes 520 (and text and internal FIGS. 510) residing in a table 500 on system 190, 100. These identifiers may reside in a table 500 stored as a file 101, that lists available combinations of text or figures and shapes with corresponding actions or programs, and input parameters to programs, that must be executed when a particular selectable item is drawn and selected. Thus, the same text may cause different actions (represented by programs 530) if the bounding shape is different. Additionally, the location 287 of the selected item 161 may affect the action taken.

FIG. 4 is a block diagram of one typical preferred data structure (table) 500 that is used to contain identifiers 510 of the available text and figures and identifiers 520 for bounding regions for selectable items 161. Location criteria 525 are also stored for each identifiers. For example, one location criteria 526 may be that two dimensional coordinates (x, y,) of the selected item reside in a particular region on the writing surface. If this location criteria is satisfied, then one of the actions 530 is triggered.

The table also contains identifiers 530 of actions (that must be performed as a result of a user selecting the selectable item) such as executing programs 531 such as phone or mail programs. The programs may take as input certain input parameters 540 which may be also specified in the table 500. Thus, for example, a user writing the word "call" 511 on writing surface 190 and circling it with a "circle" 521 many cause system 192 to dial a certain phone number on a modem 102 by executing a phone program 531 with parameters 541 such as a phone number or friend's name 285. These parameters may be specified by nearby text 285 (See FIG. 2) as explained in step 367 of flow chart 400.

If multiple functions are specified, as discussed in the explanation of step 350, by grouping 289 multiple selectable items, then the appropriate programs 531 may be executed in sequence or in parallel.

There are many applications for selectable items in addition to those discussed. For example, they may be used to activate personal information management tools (address books, to-do lists, calendars) with various parameters. They may be used to select and create calculators, clocks, text-editor options, shortcuts to web sites, etc. In three-dimensional (e.g. virtual reality) GUI, environments, users may draw on 3-D surfaces.

Given this disclosure alternative equivalent embodiments would become apparent to one skilled in the art. These embodiments are also within the contemplation of the inventors.

Having thus described our invention, what we claim as new, and desire to secure by Letters Patent is:

1. A method of directing a computer system to perform a specified function, said method comprising:

dynamically customizing at least one hand drawn symbol, each symbol to be correlated to a selected function from a set of functions;

graphically connecting each said selected function to each said at least one hand drawn customized symbol for later selection;

dynamically drawing at least one symbol representing at least one function, said drawing comprising providing positional input to an input device having position sensing software; and analyzing positional input to recognize the at least one symbol and to correlate the recognized at least one symbol to at least one function, thereby selecting said at least one symbol to perform said at least one function.

2. A method as recited in claim 1, wherein said symbol is a geometric shape.

3. A method as recited in claim 1, wherein said symbol is a geometric shape with text therein.

4. A method as recited in claim 3, wherein said symbol and said text therein are recognized by handwriting recognition software.

5. A method as recited in claim 1, wherein said symbol is a geometric shape with a figure therein.

6. A method as recited in claim 1, wherein said symbol comprises text.

7. A method as recited in claim 1, wherein said symbol comprises a geometric shape with other symbols therein, wherein each of said other symbols is assigned a function, and wherein said computer system performs all functions assigned to said other symbols when said symbol is selected.

8. A method as recited in claim 1, wherein the assignment of a function to said symbol depends upon the shape of and the text inside of said geometric shape of said symbol.

9. A method as recited in claim 1, further comprising the step of providing feedback upon selection of symbol to indicate that a corresponding function is about to be performed.

10. A method as recited in claim 1, wherein said input device is additionally associated with speech recognition software and wherein said symbol is selected by saying a specific word recognized by said speech recognition software.

11. A method as recited in claim 1, wherein said symbol is selected by a gesture detected by said computer system.

12. A method as recited in claim 1, wherein said symbol is selected by touching said symbol.

13. A method as recited in claim 1, wherein a function assigned to said symbol depends upon the position of said symbol on a surface.

14. A method as recited in claim 1, wherein said symbol is drawn by moving an object or finger in any space.

15. A method as recited in claim 1, wherein a function assigned to said symbol depends on the position of said symbol in any space.

16. A method as recited in claim 1, wherein said symbol is selected by having another symbol near former said symbol.

17. A method as recited in claim 1, wherein said symbol represents a function of an attribute when said symbol is drawn near another symbol representing said attribute.

18. A method as recited in claim 1, wherein said symbol represents a function of an attribute when said symbol is drawn with another symbol which represents an association of former said symbol with said attribute.

19. In a computer system having a digitizing surface, a method of performing selected functions comprising:

dynamically customizing at least one hand drawn symbol, each symbol to be correlated to a selected function from a set of functions;

graphically connecting each said selected function to each of said at least one hand drawn customized symbol for later selection;

dynamically drawing at least one symbol corresponding to at least one of said selected functions on said surface, said drawing comprising providing positional input to said surface having position sensing software;

analyzing said positional input to recognize said at least one symbol;

correlating said recognized at least one symbol to at least one of said functions; and performing said at least one selected function when said at least one symbol is selected.

20. A method as recited in claim 19, wherein said symbol is a geometric shape.

21. A method as recited in claim 19, wherein said symbol is a geometric shape with text therein.

22. A method as recited in claim 19, wherein said symbol is a geometric shape with a figure therein.

23. A method as recited in claim 19, wherein said symbol comprises text.

24. A method as recited in claim 19, wherein said symbol comprises a geometric shape with other symbols therein, wherein each of said other symbols is assigned a function, and wherein said computer system performs all functions assigned to said other symbols when said symbol is selected.

25. A method as recited in claim 19, wherein said correlation of at least one function to said symbol depends upon the shape of and the text inside of said geometric shape of said symbol.

26. A method as recited in claim 25, wherein said symbol and said text therein are recognized by handwriting recognition software.

27. A method as recited in claim 19, further comprising the step of providing feedback upon selection of a symbol to indicate at least one corresponding function is about to be performed.

28. A method as recited in claim 19, wherein said computer system surface is additionally associated with speech recognition software and wherein said symbol is selected by saying a specific word recognized by said speech recognition software.

29. A method as recited in claim 19, wherein said symbol is selected by a gesture detected by said computer system.

30. A method as recited in claim 19, wherein said symbol is selected by touching said symbol.

31. A method as recited in claim 19, wherein a function assigned to said symbol depends upon the position of said symbol on a surface.

32. A method as recited in claim 19, wherein said symbol is selected by having another symbol near former said symbol.

33. A method as recited in claim 19, wherein said symbol represents a function of an attribute when said symbol is drawn near another symbol representing said attribute.

34. A method as recited in claim 19, wherein said symbol represents a function of an attribute when said symbol is drawn with another symbol which represents an association of former said symbol with said attribute.

35. A computer system comprising:

a digital electronic surface;

a stylus for transmitting a signal to said surface wherein said signal represents the movements of said stylus on said surface;

at least one processor for performing the steps of:

receiving said signals to determine the movements of said stylus to customize at least one hand drawn symbol drawn on said surface by said stylus, each of said at least one symbol to be correlated to a selected function from a set of functions;

graphically connecting each said selected function to each of said at least one hand drawn customized symbol for later selected;

receiving signals to determine the movements of said stylus to determine the dynamic drawing of at least one symbol corresponding to at least one of said selected functions on said surface;

analyzing said movements to recognize said at least one symbol;

correlating said recognized at least one symbol to at least one of said functions; and performing said at least one selected function assigned to said at least one symbol.

36. A program storage device readable by a machine, tangibly embodying a program of instructions executable by the machine to perform method steps for;

dynamically customizing a hand drawn symbol to be correlated to a selected function from a set of functions;

graphically connecting said selected function to said customized symbol for later selection;

detecting dynamic input comprising drawing a symbol representing a function, said drawing comprising providing positional input to an input device having position sensing software; and analyzing positional input to recognize the at least one symbol and to correlate the recognized at least one symbol to at least one function, thereby selecting said at least one symbol to perform said at least one function.

37. A computer system comprising:

an electronic device for sensing positional input to said computer system;

at least one processor for performing the steps of:

receiving said signals to determine the positional input for dynamically customizing at least one hand drawn symbol, each of said at least one symbol to be correlated to a selected function from a set of functions;

graphically connecting each said selected function to each of said at least one hand drawn customized symbol for later selected;

receiving signals to determine the positional input to determine the dynamic drawing of at least one symbol corresponding to at least one of said selected functions on said surface;

analyzing said movements to recognize said at least one symbol;

correlating said recognized at least one symbol to at least one of said functions; and performing said at least one selected function assigned to said at least one symbol.

* * * * *